(12) United States Patent
Glendinning

(10) Patent No.: US 8,539,250 B2
(45) Date of Patent: Sep. 17, 2013

(54) SECURE, TWO-STAGE STORAGE SYSTEM

(75) Inventor: Duncan Glendinning, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1511 days.

(21) Appl. No.: 11/864,950

(22) Filed: Sep. 29, 2007

(65) Prior Publication Data
US 2009/0086965 A1 Apr. 2, 2009

(51) Int. Cl.
*G06F 11/30* (2006.01)

(52) U.S. Cl.
USPC .............. 713/189; 713/187; 726/28; 726/34; 380/44

(58) Field of Classification Search
None
See application file for complete search history.

(56) References Cited

U.S. PATENT DOCUMENTS

| 5,987,327 | A  | * | 11/1999 | Lev et al. ...................... 455/445 |
| 2003/0061499 | A1 | * | 3/2003 | Durrant ......................... 713/189 |
| 2003/0084308 | A1 | * | 5/2003 | Van Rijnswou .............. 713/189 |
| 2005/0216765 | A1 | * | 9/2005 | Petkus et al. .................. 713/201 |

* cited by examiner

*Primary Examiner* — Shewaye Gelagay
(74) *Attorney, Agent, or Firm* — Kacvinsky Daisak PLLC

(57) ABSTRACT

A two-stage storage security system comprising an address translator and a cryptographic engine for a mobile computing platform is provided. In response to a write operation, the address translator receives unencrypted data blocks, from an initiator, and associates the blocks with corresponding scrambled data storage addresses. The cryptographic engine encrypts the unencrypted data blocks to be stored on the platform storage component at the corresponding scrambled data storage addresses. The address translator applies a predetermined reversible translation function to reversibly remap addresses, and the cryptographic engine applies a predetermined cryptographic technique to encrypt and decrypt the data blocks. In a read operation, encrypted data blocks retrieved from the storage component are decrypted and restored to an original logical order. Decryption of storage component data is allowed when storage component is coupled to the corresponding platform.

13 Claims, 3 Drawing Sheets

SECURE, TWO-STAGE STORAGE SYSTEM

BACKGROUND

Mobile computing and communications devices, such as laptop and notebook computers, personal digital assistants, and mobile phones, frequently incorporate high-capacity storage components, on which confidential data may be recorded. Being relatively small and lightweight, it may be inevitable that these devices are subject to loss and theft, providing miscreants with opportunities for invasion of privacy, identity theft, and espionage.

In general, a storage device is configured with numerous addressable physical storage locations on which respective data blocks may be stored and accessed. Although allocated and accessed in use on a random-access basis, data blocks typically are represented on storage device as a sequentially-addressed logical array. Such allocation and access schemes tend to result in efficient operation of storage devices, but also may be prone to security breaches, for example, using disk recovery software illicitly.

Encryption mechanisms have been developed to mitigate harm resulting from compromised storage components. Such mechanisms may be physical or virtual; may be implemented in hardware, in software, or in a combination thereof; and may use one or more keys to encrypt, for example, a file, a data volume, a logical disk partition, or a physical disk.

Although access to the encrypted data may be denied without the corresponding encryption key, it may be possible for a determined miscreant to discover a concealed key or password stored on the disk, or to intuit a successful decryption attack using a number of cryptanalysis and investigative techniques. Some security schemes may be circumvented simply by removing a storage device from its host platform and connecting it to a foreign platform. Also, complex storage security and cryptography schemes may be vulnerable to failure due to disuse, to irretrievable data loss due to simple drive controller failure, or to an inadvertently lost or forgotten password or encryption key.

Systems and methods are needed to overcome the above-noted shortcomings.

BRIEF DESCRIPTION OF THE DRAWINGS

Features, elements, and aspects of the present invention that are referenced by the same numerals in different figures represent the same, equivalent, or similar features, elements, or aspects, in accordance with one or more embodiments.

DETAILED DESCRIPTION OF EXEMPLARY EMBODIMENT

Figure 1:
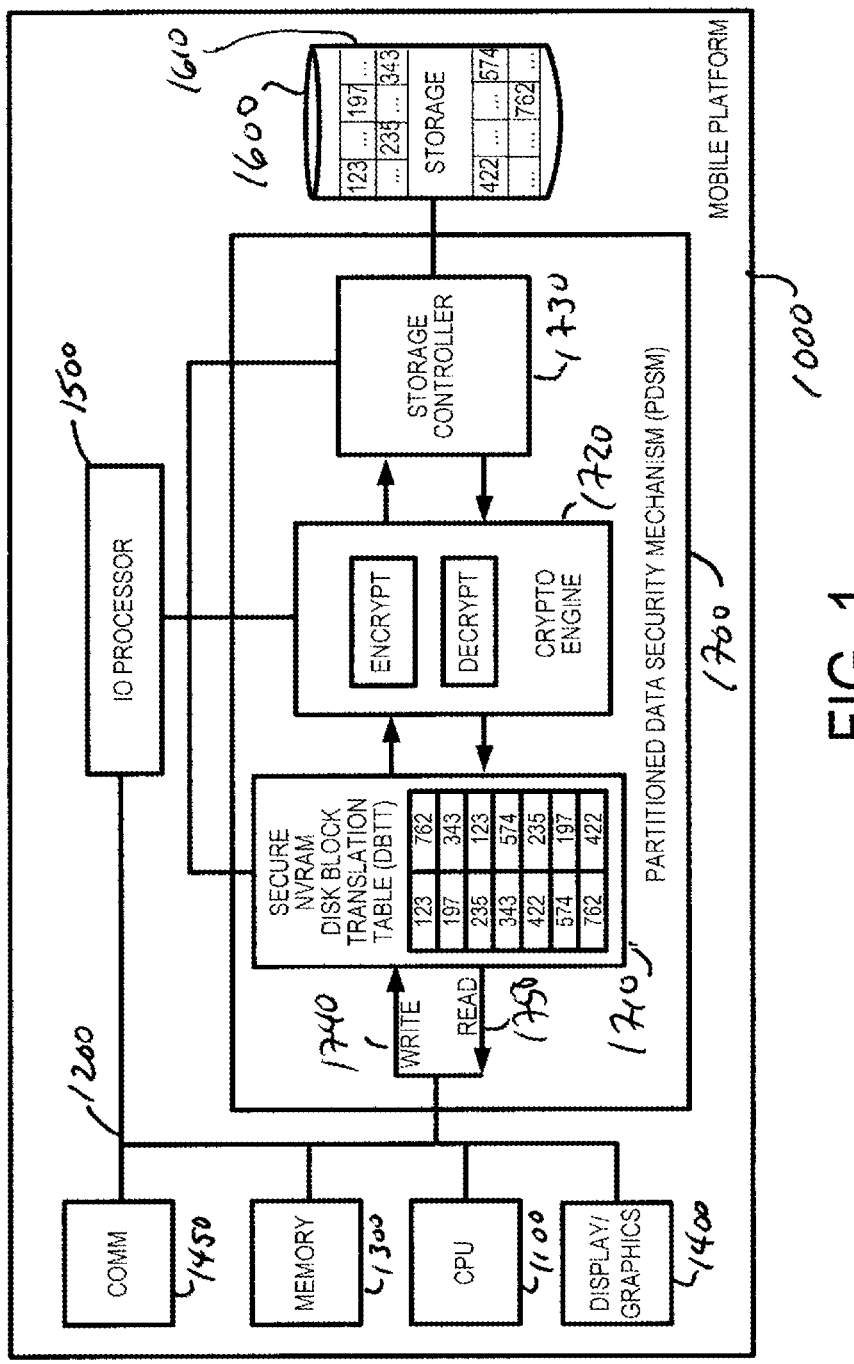
FIG. 1 is a block diagram illustrating an exemplary mobile platform, in accordance with one embodiment.

Referring to FIG. 1, example mobile platform 1000 can be representative of a device capable of mobile computing, mobile communication, or both, including, without limitation, a laptop, a notebook, or a tablet computer, a personal digital assistant, a handheld wireless entertainment device, or a mobile phone. In general, the term "platform" may encompass any computing, communication, or networking device or system, with a mobile platform being a platform capable of easy transport, for example, by hand, in a handbag, pocket, or in a vehicle. Mobile platform 1000 can include central processor (CPU) 1100 configured to process data under the control of system software including, for example, an operating kernel or an application program. CPU 1100 can be coupled to interconnect bus 1200 to exchange data with memory 1300 during processing. Memory 1300 also may serve as a reservoir of software instructions to which CPU 1100 responds.

Platform 1000 also may include graphic display processor 1400, communication processor 1450, or both, which may exchange data over interconnect bus 1200 with CPU 1100, memory 1300, or both. Graphic display processor 1400 may be render data into a format perceivable to a platform user (not shown). Communication processor 1450 may be representative of one or more functional elements by which mobile platform 1000 may exchange data with a connectable communication device (not shown) configured to communicate with mobile platform 1000, using a wire line communication link, a wireless communication link, or both.

Non-limiting examples of wireless communication links include a mobile telephony link, a wireless metropolitan area network (WMAN) link, a wireless local area network (WLAN), or a wireless personal area network (PAN). Similarly, non-limiting examples of a wire line communication link include a wire or optical fiber computer link, data network link, or telephony link. In addition, a wire line link also may be used or configured to be removably joined to mobile platform, for example, by a PC Card.

A mobile platform user may interact with mobile platform 1000 by one or both of processors 1400 and 1500 cooperating to provide a user interface function. Alternatively, a separate interface processor (not shown) may be coupled to interconnect bus 1200 to provide user interface functionality.

Storage component 1600 may be configured to communicate with, and to provide non-volatile data storage for, mobile platform 1000. Storage component 1600 can be an internal storage device physically attached within mobile platform 100, but which is capable of being removed therefrom and coupled to another platform. Storage component 1600 may be implemented using known electrical, magnetic, optical, or semiconductor memory storage techniques, or operable combinations thereof, and may be in a form factor such as one or more disks, cards, or other tangible, preferably non-volatile, storage media.

A non-limiting example of an internal storage device implementation of storage component 1600 may include a miniature magnetic hard disk drive, although storage component 1600 also may be a electrical, optical, or semiconductor memory storage device. In one embodiment, storage component 1600 is configured with numerous addressable physical storage locations, logically represented as a sequentially-addressed array of data blocks at 1610, for example.

Storage device 1600 can be coupled through partitioned data security mechanism (PDSM) 1700 to interconnect bus 1200. PDSM 1700 can include an address translator, such as disk block translation table (DBTT) 1710, and cryptographic engine (CE) 1720, and also may include storage controller 1730. IO processor 1500 may manage DBTT 1710, CE 1720, storage controller 1730, collectively PDSM 1700, for example, under the direction of CPU 1100, or in response to a state of storage component 1600. In accordance with one implementation, it may be desirable to configure IO processor 1500 also to be responsive to one or both of display graphics processor 1400, or communications processor 1450.

PDSM 1700 can effect reversible cryptographic transformation of data blocks between storage component 1600, and one or more of the aforementioned processors 1100, 1400, 1450, or memory 1300, using a two-stage storage security mechanism. In one embodiment, DBTT 1710 can be configured to reversibly scramble, or render non-linear, a storage location order, which otherwise may be linearly associated with preselected data blocks. Also, CE 1720 can be configured to implement a predetermined reversible cryptographic technique.

In certain embodiments, a scrambled address may be generated for a storage location using DBTT 1710, with a data block being encrypted by CE 1720, and stored by storage controller 1730 at the location associated with the scrambled address. Accordingly, encryption of data on storage component 1600 may be less prone to defeat or circumvention, while also facilitating data destruction in an improperly-accessed recoverable mobile platform 1000.

Selected embodiments of an address translator in the form of DBTT 1710 can be implemented using a predetermined reversible translation function to generate and store scrambled addresses in a non-volatile storage element, such as a non-volatile random access memory (NVRAM) and, desirably, a secure NVRAM. DBTT 1710 may be arranged as a two-column table having a plurality of rows, with each table row being associated with a storage location, such that a first column represents an original storage location address, and a second column represents a corresponding scrambled storage location address.

In accordance with one embodiment, a suitable predetermined reversible translation function may include, without limitation, a pseudorandom translation function or a reversible hash function, which may be a cryptographic hash function. CE 1720 can employ a predetermined reversible cryptographic transformation, encrypting data written to, and decrypting data read from, storage component 1600. CE 1720 can implement, for example, public key cryptography using well-known cryptographic functions, and may be realized in hardware, in software, or in an operable combination thereof.

It is desirable that implementations of DBTT 1710 and CE 1720 minimize latency such that the two-stage storage security mechanism may be capable of providing on-the-fly encryption and decryption of data blocks being processed by PDSM 1700.

Storage controller 1730, in one embodiment, provides a storage interface with storage component 1600 for logical data and corresponding physical representations to be written to, or read from, storage component 1600. In selected embodiments in which storage component 1600 comprises a hard disk drive, storage controller 1730 may selectively activate READ/WRITE magnetic elements, or heads, to effect the selected storage operation (i.e., READ or WRITE) at a preselected data storage location.

In certain embodiments of platform 1000, PDSM 1700 may be embodied as a host bus adapter, into which storage controller may be functionally integrated. In certain alternative embodiments, storage controller 1730 may be integrated with storage component 1600. Non-limiting examples of suitable storage interfaces may include a serial or parallel Small Computer System Interface (SCSI), a FibreChannel interface, or a serial or parallel Advanced Technology Attachment (ATA) interface, with the foregoing interfaces being described by corresponding standards promulgated by respective T10, T11, and T13 Technical Groups of the InterNational Committee on Information Technology Standards (INCITS). Of course, depending on implementation, other suitable storage interfaces also may be used.

Accordingly, relative to writing data to storage component 1600, in an example first storage security WRITE stage, PDSM 1700 can invoke DBTT 1710 to translate linear data block locations 1610 into a transformed array of data block locations using a predetermined translation function. Also, in an example second storage security WRITE stage, PDSM 1700 can invoke CE 1720 to encrypt data received from interconnect bus 1200 over WRITE path 1715.

In certain embodiments, a suitable predetermined translation function may be a predetermined pseudorandom translation function, in which data block locations 1610 may be represented by a pseudo-random array of data block locations. PDSM 1700 may cause storage controller 1730 to write the encrypted data to a transformed array of data block locations. Similarly, in an example first storage security READ stage, PDSM 1700 can invoke CE 1710 to cooperate with storage controller 1730 such that encrypted data stored in the data block locations represented by a transformed array may be retrieved from storage element 1600 and decrypt data blocks retrieved.

In an example second storage security READ stage, PDSM 1700 can invoke DBTT 1710 to rearrange decrypted data blocks in an original linear order, employing a suitable predetermined reversing function. For example, where DBTT 1710 employs a predetermined pseudorandom translation function, during a WRITE operation, DBTT 1710 also can employ a predetermined pseudorandom reversing function. DBTT 1710 then may transmit reordered data blocks over READ path 1750 to interconnect bus 1200.

DBTT 1710 can be configured to be globally unique, with respect to each mobile platform 1000. Advantageously, data encrypted onto storage component 1600 may be decrypted and accessed so long as component 1600 remains coupled to original mobile platform 1000, but remain encrypted and be inaccessible if storage component 1600 is removed from mobile platform 1000 and coupled to another platform.

Figure 2:
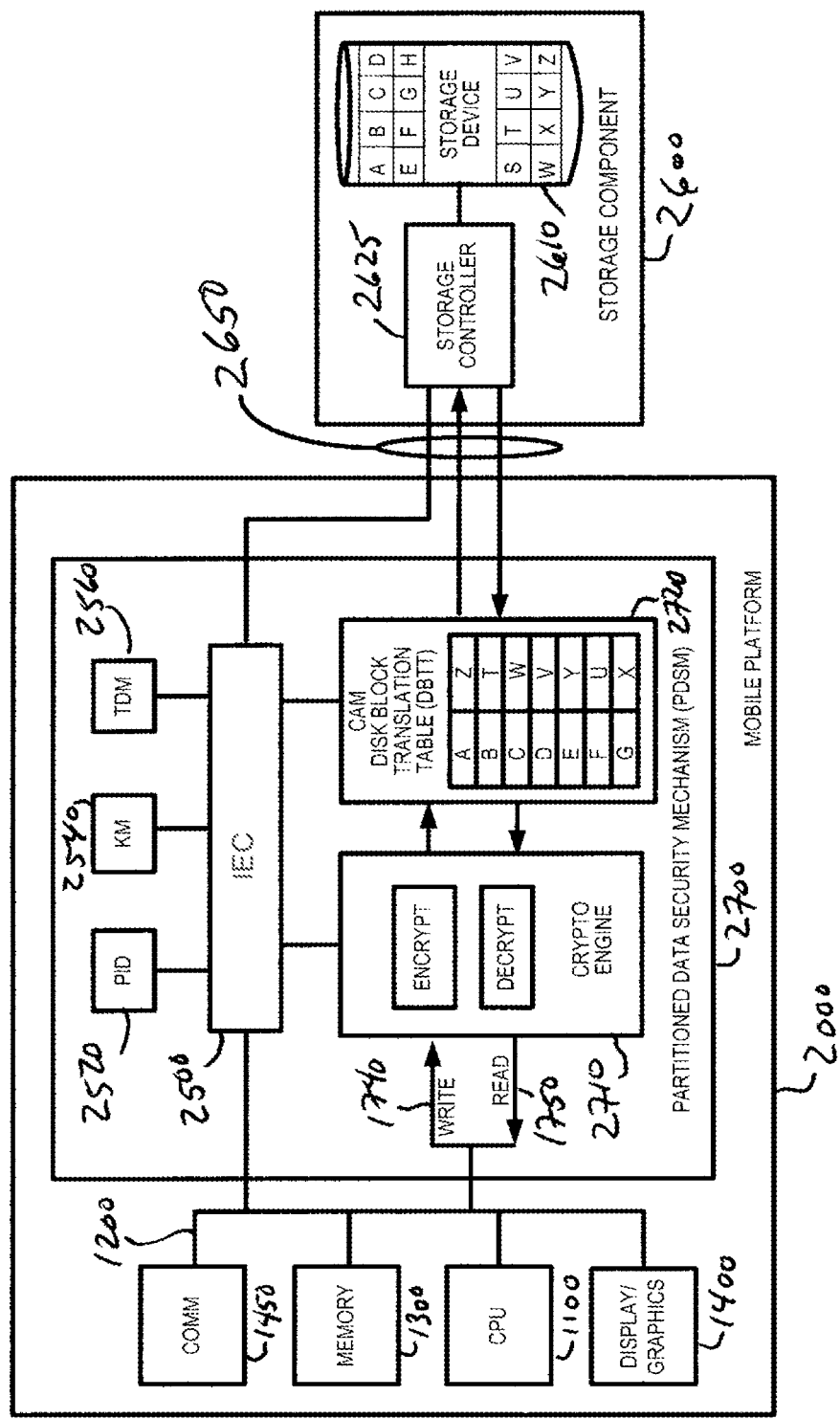
FIG. 2 is a block diagram illustrating an exemplary mobile platform, in accordance with another embodiment.

FIG. 2 illustrates another embodiment of a platform, which may be mobile platform 2000, in which CPU 1100 and memory 1300 can be coupled by interconnection bus 1200. One or both of display graphics processor 1400 or communication processor 1450 also may be included in mobile platform 2000. When implemented as an external storage device, storage component 2600 may be coupled to mobile platform 1000 with storage link 2650, which may be a guided media link or an unguided media link.

In some embodiments, storage component 2600 may comprise one or more storage devices 2610 under the control of storage controller 2625. Storage device 2610 may be, for example, a hard disk drive having one or more rotating magnetic disks bearing locations on which data may be stored. Storage component 2600 also can be a hybrid storage device, bearing characteristics of both an internal storage device and an external storage device including, for example, removable memory cards.

Non-limiting examples of storage link 2650 may include a guided media link configured in accordance with a Universal Serial Bus (USB) specification, with an implementation of IEEE Standard 1394, or with a modular expansion interface specification, such as the PCMCIA PC Card or ExpressCard modular expansion interface standards. Similarly, non-limiting examples of storage link 2650 also may include an unguided media link configured in accordance with a wireless MAN, LAN, or PAN standard, as may be typified by IEEE Standards 802.16, 802.3, or 802.15, respectively.

PDSM 2700 can effect reversible cryptographic transformation of data blocks, using a two-stage storage security mechanism. PDSM 2700 can be coupled to interconnection bus 1200 between storage component 2600, and one or more of the aforementioned processors 1100, 1400, 1450, or memory 1300. Similar to PDSM 1700 in FIG. 1, PDSM 2700 may include CE 2710 and an address translator such as DBTT 2720, employing a separate WRITE data path 1740 and READ data path 1750.

In selected embodiments of PDSM 2700, manageability engine (ME) 2500 may be included to manage the operation of, and cooperation between, CE 2710 and DBTT 2720. Although IEC 2500 is illustrated within PDSM 2700, it may be disposed in platform 2000 apart from, but can remain coupled to, PDSM 2700. In addition, it may be desirable to provide IEC 2500 with at least one of platform ID storage (PID) 2520, cryptographic key manager (KM) 2540, and theft deterrent manager (TDM) 2560. CE 2710 may be similar in functionality to CE 1720 in FIG. 1.

DBTT 2720 also may be similar in functionality to DBTT 1710 in FIG. 1. In an alternative embodiment of PDSM 2700, DBTT 2720 may be implemented as a two-way content-addressable memory (CAM), in which a predetermined linear data location is associated with a transformed data location, and in which a CAM input received on WRITE path 1740 and corresponding to the original data block location, e.g., an original disk block address, produces a CAM output corresponding to a transformed data block location, e.g., a pseudo-randomized disk block address.

Conversely, a CAM input received on READ path 1750 and corresponding to a transformed data location may produce a CAM corresponding to an associated original data location. Moreover, DBTT 2720 may be implemented in other forms of hardware, software, or an operable combination thereof. Conveniently, DBTT 2720 may be generated by IEC 2500 when CE 2710 is enabled, or may be pre-installed, for example, during the manufacturing of at least a portion of mobile platform 2000.

In one embodiment, it may be advantageous to provide PID 2520 as an identifier that is globally unique, or unique relative to a predetermined characteristic, which may be a predetermined platform characteristic of platform 2000. PID 2520 may be stored in a secure memory element coupled to IEC 2500, but may be disposed externally to IEC 2500, PDSM 2700, or platform 2000. Without limitation, PID 2520 may be used by IEC 2500, CE 2710, or DBTT 2720, as a cryptographic key, or of a seed for generating a cryptographic key.

IEC 2500 may employ key manager 2540 to facilitate cryptographic operations of CE 2720. Key manager 2540 may manage, for example, seeds, or permanent, semi-permanent, or temporary keys, which may be used by IEC 2500 or CE 2710, as well as to facilitate generation of hash tables, pseudorandom storage address re-mapping, or CAM key values, which may be used by DBTT 2720.

In certain embodiments, TDM 2560 may implement a theft deterrence mechanism in mobile platform 2000, which may render storage component 2600 unusable in response to a predetermined security fault, for example, by disabling a READ operation using one or more of CE 2710 and DBTT 2720. TDM 2560 may monitor a security state of platform 2000, for example, by sensing signals representative of the security state from storage component 2600, from IEC 2500, one or more of processors 1100, 1400, or 1450.

Non-limiting examples of a predetermined security fault may include detecting separation of storage component 2600 from mobile platform 2000, receiving an erroneous password or encryption when solicited from a user of mobile platform 2000, or detecting an intrusion attempt into storage component 2600, for example, by a faulty application program operation, or by a surreptitious attack received through communication processor 1450. Upon detecting a security fault, TDM 2560 may delete a cryptographic key used by CE 2710, may delete DBTT 2720, or both.

In an embodiment where storage device 2610 is a disk drive, TDM 2560 may destroy a disk encryption key. To assist a legitimate user in recovering encrypted data from storage component 2600 after TDM 2560 operates in response to a predetermined security fault, IEC 2500 may be configured to receive a security override key, as may be provided by an issuing authority, such as a manufacturer, OEM, or vendor of mobile platform 2000. Such a security override key may be used to restore functions and elements rendered unusable by TDM 2560, for example, by facilitating generation of cryptographic keys corresponding to mobile platform 2000 and regeneration of DBTT 2720 such that encrypted data blocks stored on storage component 2600 may be decrypted successfully.

As described relative to the embodiments of mobile platform 1000 in FIG. 1, embodiments of mobile platform 2000 in FIG. 2, can provide partitioned storage security by employing a two-stage storage security apparatus in accordance with the teaching herein. Partitioned storage security can facilitate successful decryption of encrypted data when storage component 2600 is operably coupled to mobile platform 2000, but may substantially defeat decryption when storage component 2600 is used apart from corresponding mobile platform 2000, for example, in a foreign platform or storage device analysis system.

Figure 3:
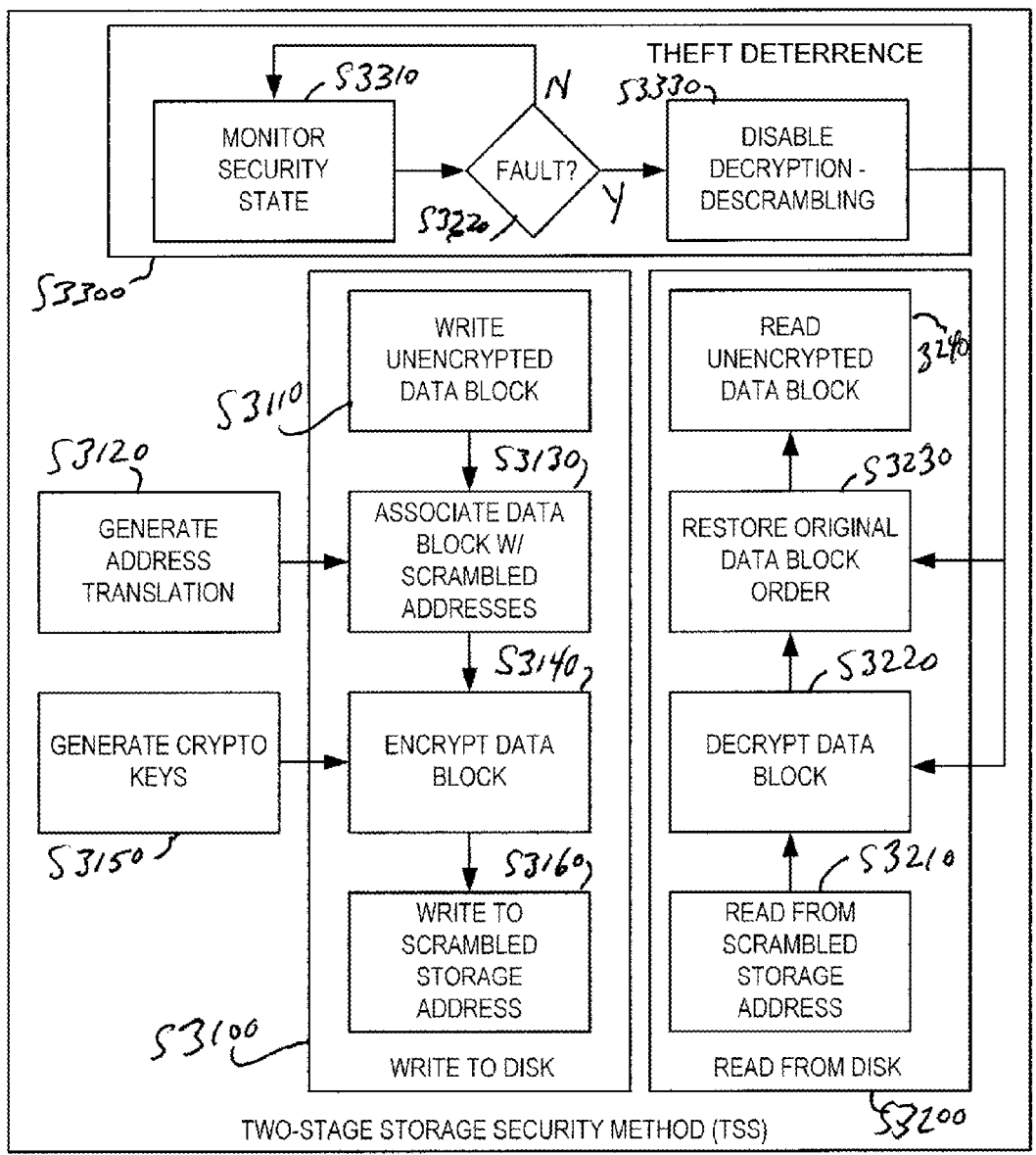
FIG. 3 is a block diagram illustrating a two-stage storage security method, in accordance with one embodiment.

FIG. 3 illustrates an embodiment of two-stage storage security (TSS) method 3000, which may be used with, or apart from, embodiments of mobile platforms 1000 and 2000, illustrated in FIGS. 1 and 2, respectively. A storage device, for example, as represented by storage components 1600 and 2600, may have numerous physical locations for data storage, each of which may correspond to a logical data storage address. To effect a data block WRITE operation, a data block can be associated with, and subsequently written to, a preselected data storage address. By comparison, to effect a data block READ operation, a data block may be retrieved by accessing a preselected storage address with which the data block has been associated.

In accordance with one embodiment, TSS method 3000 may comprise writing a data block to a storage device (WRITE operation) (S3100), reading a data block from a storage device (READ operation) (S3200), or both. WRITE operation S3100 can proceed by receiving from an initiator an unencrypted data block and writing the unencrypted data block to a storage device (S3110). Within the exemplary context of mobile platform 1000, one or more unencrypted data blocks may be received over interconnect bus 1200 from CPU 1100 to write to storage component 1600.

Data storage addresses may be represented as a logically sequential linear array of data storage addresses. However, in certain embodiments, it may be desirable to scramble an original data storage address with which a data block will be associated into a translated data storage address, using a predetermined translation function. Non-limiting examples of a suitable predetermined translation function comprise a reversible pseudorandom mapping function or a hashing function, which may be a cryptographic hashing function.

Referring back to FIG. 3, generating an array of translated data storage addresses (S3120) may be desirable to increase efficiency of scrambling. WRITE operation S3100 may proceed by associating a data block with a preselected translated data storage address (S3130), and by encrypting the data block (S3140) using a predetermined cryptographic technique. The encrypting may be preceded by generating one or more cryptographic keys (S3150), for example, which may be used during WRITE operation S3100, READ operation S3200, or both. After encrypting, WRITE operation S3100 may be concluded by writing an encrypted data block to the preselected scrambled data storage address on the platform storage component (S3160).

In one embodiment, it may be desirable that TSS 3000 is reversible. Accordingly, READ operation S3200 can proceed by reading from a scrambled storage address (S3210) (i.e., by retrieving an encrypted data block from a preselected translated data storage address on the platform storage component), in response to a request by an initiator. Decrypting an encrypted data block (S3220) may be accomplished, for example, using a cryptographic key, which may have been generated previously, e.g., by operation S3150.

To facilitate efficient storage device operation, more than one encrypted data blocks may be retrieved from the storage device and decrypted. However, decrypted data blocks may still be associated with respective preselected translated data storage addresses, and be out-of-order from the original order in which they existed before being written to a storage device. Accordingly, READ operation S3200 may continue by restoring the decrypted data blocks to the original logical order (S3230), by employing a suitable predetermined reversing function. When one or more retrieved data blocks have been decrypted and returned to an original logical order, READ operation 3200 may conclude by transmitting ordered data blocks to the requesting initiator or, in other words, by making the data blocks available to be read (S3240).

It may be advantageous to provide certain embodiments of TSS method 3000 with a theft deterrence operation (S3300). In one embodiment, theft deterrence operation S3500 may comprise monitoring a security state of a corresponding platform (S3310). Upon detecting a predetermined security fault (S3320), theft deterrence process S3500 may proceed by disabling one or more steps corresponding to READ operation 3200 including, without limitation, disabling decryption descrambling (S3330) by decrypting retrieved encrypted data blocks (S3220), restoring decrypted data blocks to their respective original logical order (S3230), or both.

In one embodiment, disabling decryption descrambling (S3330) may be implemented by destroying a cryptographic key used to decrypt retrieved data blocks or, where restoring an original data block logical order employs a table or associative memory, by erasing the table or associative memory, respectively.

Certain embodiments herein contemplate a computer program product of a computer-readable medium having executable instructions for performing an embodiment of one or more storage operations corresponding to TSS method 3000 on a platform, including performing an embodiment of WRITE operation S3100, READ operation S3200, or theft deterrence operation S3300.

The platform may be a mobile platform. For example, in an embodiment, or a portion thereof, including WRITE operation S3100, executable instructions may perform one or both of associating a data block with a preselected translated data storage address (S3130), or encrypting the data block using a predetermined cryptographic technique (S3140).

WRITE operation executable instructions also may perform generating an array of translated data storage addresses using a predetermined translation function (S3120), which may be a reversible pseudorandom mapping function or a hashing function. In addition, WRITE operation executable instructions may perform generating one or more cryptographic keys for use during encryption, decryption, or both. WRITE operation executable instructions also may include executable instructions for receiving an unencrypted data block in an original logical order from an initiator, for writing an encrypted data block to a preselected translated data storage address, or both.

Also, in an embodiment, or a portion thereof, including READ operation S3200, executable instructions may perform one or both of decrypting an encrypted data block using a predefined cryptographic key (S3220), or restoring decrypted data blocks to an original logical order (S3230), employing a suitable predetermined reversing function. READ operation executable instructions also may perform reading an encrypted data block from a translated storage address on a storage device, responsive to an initiator, transmitting an ordered decrypted data blocks for reading by the initiator, or both.

Further, in an embodiment, or a portion thereof, corresponding to a theft deterrence operation S3300, executable instructions may perform one or both of monitoring a corresponding platform for the occurrence of a predetermined security fault, or disabling one or more steps corresponding to READ operation 3200 (S3330) including, without limitation, disabling decrypting retrieved encrypted data blocks (S3220), restoring decrypted data blocks to their respective original logical order (S3230), or both.

It should be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it also should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. An apparatus, comprising:
a memory;
a processor coupled to the memory;
an address translator configured in accordance with a predetermined translation function to translate respective original data storage addresses arranged in an original order to respective translated data storage addresses arranged in a translated order, wherein respective data blocks are associated with the respective translated data storage addresses, and wherein the address translator is configured to exchange the respective data blocks with a platform having data storage locations configured to store the respective data blocks, wherein the data storage locations correspond to respective data storage addresses;
a cryptographic engine coupled to the address translator and configured to reversibly encrypt the respective data blocks in accordance with a predetermined cryptographic function, wherein the cryptographic engine is configured to exchange encrypted data blocks with the storage component;
the processor arranged to implement at least one of the address translator or the cryptographic engine;
wherein the translation function comprises a globally unique function with respect to one or more predetermined characteristics of the platform and the globally unique function is used to facilitate generation of the translated data storage addresses; and a manageability engine coupled to the cryptographic engine and the address translator, wherein the manageability engine configures at least one of the cryptographic engine in accordance with the predetermined cryptographic function or the address translator in accordance with the predetermined translation function.

2. The apparatus of claim 1, wherein:

the address translator is configured to reversibly translate between respective original data storage addresses and respective translated data storage addresses in accordance with a predetermined translation function, wherein the respective original data storage addresses are restored from the respective translated data storage addresses in accordance with a predetermined reversing function; and the cryptographic engine is configured to reversibly encrypt the respective data blocks in accordance with the predetermined cryptographic function, wherein the platform comprises a mobile platform.

3. The apparatus of claim 1, wherein the manageability engine further comprises a theft deterrent manager configured to disable at least one of the address translator or the cryptographic engine in response to a detected security fault.

4. The apparatus of claim 2, wherein the manageability engine further comprises a theft deterrent manager configured to disable at least one of the address translator or the cryptographic engine in response to a detected security fault.

5. A computer-implemented method, comprising:

securing a platform storage component of a mobile platform having data storage locations configured to store respective data blocks thereon, wherein the data storage locations correspond to respective data storage addresses arranged in an original data storage address order, the securing comprising:

using a predetermined reversible translation function, translating ones of the respective data storage addresses from an original data storage address order to a translated data storage address order, producing translated data storage addresses;

associating ones of the respective data blocks with respective ones of the translated data storage addresses;

using a predetermined reversible cryptographic function, encrypting the ones of the respective data blocks to produce encrypted data blocks to store on the platform storage component;

wherein the translation function comprises a globally unique function with respect to one or more predetermined characteristics of the mobile platform and the globally unique function is used to facilitate generation of the translated data storage addresses; and using a manageability engine coupled to a cryptographic engine and an address translator, configuring at least one of the cryptographic engine in accordance with the predetermined cryptographic function or the address translator in accordance with the predetermined translation function.

6. The computer-implemented method of claim 5, wherein the storage component has the encrypted data blocks stored on respective ones of the translated data storage addresses, the method further comprising:

decrypting the encrypted data blocks using the predetermined reversible cryptographic function to produce unencrypted data blocks, wherein the unencrypted data blocks are associated with the ones of the translated data storage addresses;

translating ones of the translated data storage addresses into the respective ones of the respective data storage addresses in the original data storage address order; and associating the unencrypted data blocks with respective ones of the respective data storage addresses in the original data storage address order.

7. The computer-implemented method of claim 5, further comprising at least one of:

generating an address translation table using the predetermined reversible translation function, wherein the address translation table is at least partially unique to the platform; and generating a cryptographic key for the predetermined reversible cryptographic function in accordance with a predetermined cryptographic technique, wherein the cryptographic key is at least partially unique to the platform, wherein the platform storage component is coupled to the mobile platform in order to decrypt the encrypted data blocks on the storage component.

8. The computer-implemented method of claim 6, further comprising:

monitoring the mobile platform for a predetermined security fault; and responsive to a sensed predetermined security fault, disabling at least one of decrypting the encrypted data blocks, translating ones of the translated data storage addresses, or associating the unencrypted data blocks in the original data storage address order.

9. An article comprising a non-transitory computer-readable storage medium containing instructions that if executed by a processor enable a system to perform the steps of:

performing storage operations on a mobile platform having a storage component and an initiator;

associating unencrypted data blocks with respective preselected translated data storage addresses, by applying a predetermined reversible translation function, wherein the unencrypted data blocks are received from the initiator in an original storage address order;

encrypting the unencrypted data blocks by applying a predefined reversible cryptographic key, producing encrypted data blocks, wherein the encrypted data blocks are configured to be written at respective preselected translated data storage addresses to the storage component coupled to the mobile platform;

wherein the translation function comprises a globally unique function with respect to one or more predetermined characteristics of the mobile platform and the globally unique function is used to facilitate generation of the translated data storage addresses; and using a manageability engine coupled to a cryptographic engine and an address translator, configuring at least one of the cryptographic engine in accordance with the predetermined cryptographic function or the address translator in accordance with the predetermined translation function.

10. The article of claim 9, comprising that when executed enable the steps of:

decrypting encrypted data blocks by applying the predefined reversible cryptographic key and producing decrypted data blocks, wherein the encrypted data blocks are retrieved from preselected translated data storage addresses on the storage component; and restoring decrypted data blocks to respective preselected original data storage addresses in an original logical order, by applying the predetermined reversible translation function, wherein the decrypted data blocks are configured to be transmitted to the initiator in the original logical order.

11. The article of claim 9, comprising instructions that when executed enable the steps of:
generating an address translation table configured to map between original data storage addresses and respective preselected translated data storage addresses using the predetermined reversible translation function, wherein the address translation table is at least partially unique to the mobile platform; and
generating the predefined reversible cryptographic key in accordance with a predetermined cryptographic technique, wherein the reversible cryptographic key is at least partially unique to the platform.

12. The article of claim 9, comprising instructions that when executed enable the steps of:
monitoring the mobile platform for a predetermined security fault; and
responsive to the predetermined security fault, disabling at least one of applying the predefined reversible cryptographic key or applying the predetermined reversible translation function.

13. The article of claim 9, comprising instructions that when executed enable the steps of:
decrypting encrypted data blocks by applying the predefined reversible cryptographic key and producing decrypted data blocks, wherein the encrypted data blocks are retrieved from preselected translated data storage addresses on the storage component, and wherein the reversible cryptographic key is at least partially unique to the platform;
restoring decrypted data blocks to respective preselected original data storage addresses in an original logical order, by applying the predetermined reversible translation function, wherein the decrypted data blocks are configured to be transmitted to the initiator in the original logical order, wherein the reversible cryptographic key is at least partially unique to the platform;
monitoring the mobile platform for a predetermined security fault; and
responsive to the predetermined security fault, disabling at least one of applying the predefined reversible cryptographic key or applying the predetermined reversible translation function,
wherein the platform storage component is coupled to the mobile platform in order to decrypt the encrypted data blocks on the storage component and wherein the translation function comprises a globally unique function with respect to the mobile platform.

* * * * *